United States Patent
Tseng et al.

[11] Patent Number: 6,047,164
[45] Date of Patent: Apr. 4, 2000

[54] METHOD FOR CONTROLLING THE SIGNALS OF AN ERMES PAGER

[75] Inventors: Shyi-Jing Tseng, Miaoli Hsien; Chieh-Hsiang Chen, Kaohsiung, both of Taiwan

[73] Assignee: Winbond Electronics Corp., Hsinchu, Taiwan

[21] Appl. No.: 09/055,174

[22] Filed: Apr. 3, 1998

[30] Foreign Application Priority Data

Jan. 16, 1998 [TW] Taiwan ................................. 87100584

[51] Int. Cl.⁷ ........................................................ H04Q 7/00
[52] U.S. Cl. ................... 455/32.1; 455/38.1; 340/825.94
[58] Field of Search ............................... 455/32.1, 38.1, 455/38.5, 31.1, 455, 576, 432; 340/825.44, 825.2, 825.04, 825.03

[56] References Cited

U.S. PATENT DOCUMENTS

| | | | |
|---|---|---|---|
| 4,905,301 | 2/1990 | Krolopp et al. | 455/434 |
| 4,914,649 | 4/1990 | Schwendeman et al. | 370/311 |
| 5,442,806 | 8/1995 | Barber et al. | 455/435 |
| 5,565,859 | 10/1996 | Matsumoto | 340/480 |
| 5,610,919 | 3/1997 | Willard et al. | 370/336 |
| 5,625,351 | 4/1997 | Willard et al. | 340/825.52 |
| 5,740,534 | 4/1998 | Ayerst et al. | 455/434 |
| 5,751,773 | 5/1998 | Campana, Jr. | 375/346 |
| 5,907,795 | 5/1999 | Hwang | 455/38.3 |

OTHER PUBLICATIONS

RES4/RSS(89), "Semi–Distributed Addressing, A New Concept for ERMES Radio Protocol", Norway, May, '1989,

*Primary Examiner*—Reinhard J. Eisenzopf
*Assistant Examiner*—Charles N. Apprah
*Attorney, Agent, or Firm*—Ladas & Parry

[57] ABSTRACT

A RF-signal controlling method applied for controlling the operation of a pager in an ERMES system is disclosed. By such a method, the pagers can establish a synchronization link with the base stations during the shortest time interval, and lock on the home channel rapidly to receive messages by channel scanning. Furthermore, under the control of the method, the pagers can finish receiving messages while in a mode of channel switching, in roaming states or in the border areas with weak signals.

20 Claims, 5 Drawing Sheets

METHOD FOR CONTROLLING THE SIGNALS OF AN ERMES PAGER

BACKGROUND OF THE INVENTION

1. Field of the Invention

The present invention relates in general to a method for controlling RF signals, more specifically, to a method for controlling the signal transmission and reception of an ERMES (European Radio Message System) pager.

2. Description of the Related Art

With the development of global commerce, the demand for telecommunication has increased rapidly. One of the popular communication devices is the pager. The first generation pagers, POCSAG, can no longer meet the requirements of versatility demanded by today's users. Therefore, the ERMES protocol of second-generation pagers has been proposed to improve the function of pagers.

The pagers according to the ERMES protocol have the following new features: a high transmission rate (about 6250 bps), high receiving capacity (about 64 K bits), roaming function, group call, and remote programming. The potential market for ERMES second-generation pagers is very large, therefore developing the key devices for ERMES pagers can be highly beneficial. The performance of such key devices for pagers depends on the method of controlling the operation of the pagers.

SUMMARY OF THE INVENTION

Therefore, an object of the present invention is to provide a method for controlling the RF signals of an ERMES pager, wherein the method comprises the following steps (a)~(h).

In step (a), after turning on the pager, the pager keeps checking if a starting signal ON is activated (that is, checks if the signal ON equals 1). If ON equals 1, the next step is carried out.

In step (b), the pager receives batch data from a base station, and the pager tries to establish a synchronization link with the base station by using the data of the synchronization partition in the batch data. The batch data include a synchronization partition, system information partition, address partition, and message partition.

In step (c), the pager checks if the synchronization link is established (that is, if the synchronization index synflag equals 1). If synflag equals 1 then the synchronization link is established, and the next step is carried out.

In step (d), the pager carries out channel scanning process to find the home channel, because the starting channel is not necessarily the home channel.

In step (e), the pager compares the frequency subset number (FSN) and operator identity (OPIDP) established in the pager with the frequency subset indicator (FSI) and operator identity (OPID) packaged in the system information partition. If the comparing result is not matched, a roaming process is carried out, and if it is matched, the next step is carried out.

In step (f), the pager carries out a channel locking process in order to lock on the home channel to receive message.

In step (g), the pager compares its own initial address (IA) with the data packaged in the address partition. If there is an address in the address partition corresponding to the initial address of the pager, then the pager locks on the channel to advance to the next step, or if not, the channel locking process is carried out again.

In step (h), the pager receives the data in the message partition in iteration, when the pager finishes receiving data in this message partition or the predetermined receiving time interval has passed (time out), then the step (f) is carried out again.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
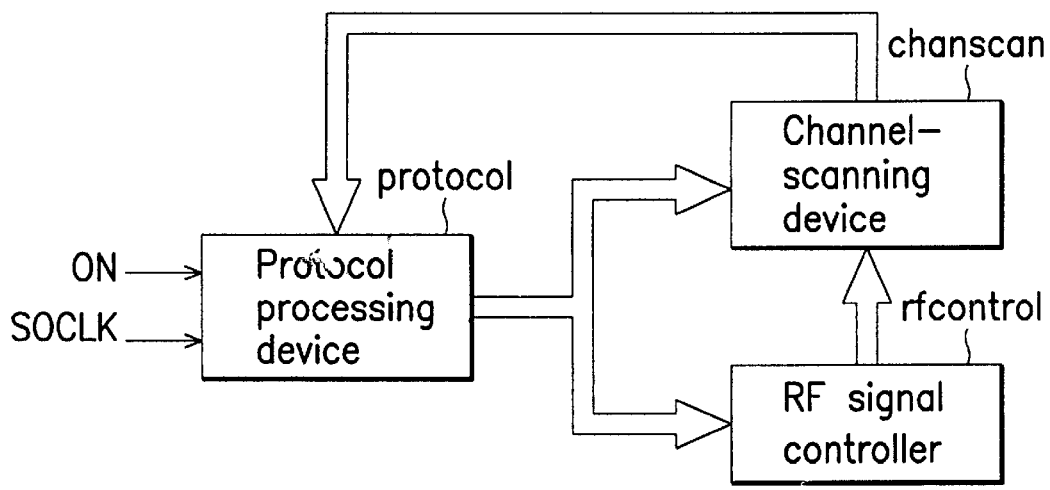
FIG. 1 shows a circuit diagram of the ERMES pager.

FIG. 1, shows a circuit diagram of the ERMES pager. The pager comprises a protocol processing device (protocol), a channel-scanning device (chanscan), and a RF signal controller (rfcontrol), and the three circuit blocks are described hereinafter.

I. Protocol processing device

Figure 2:
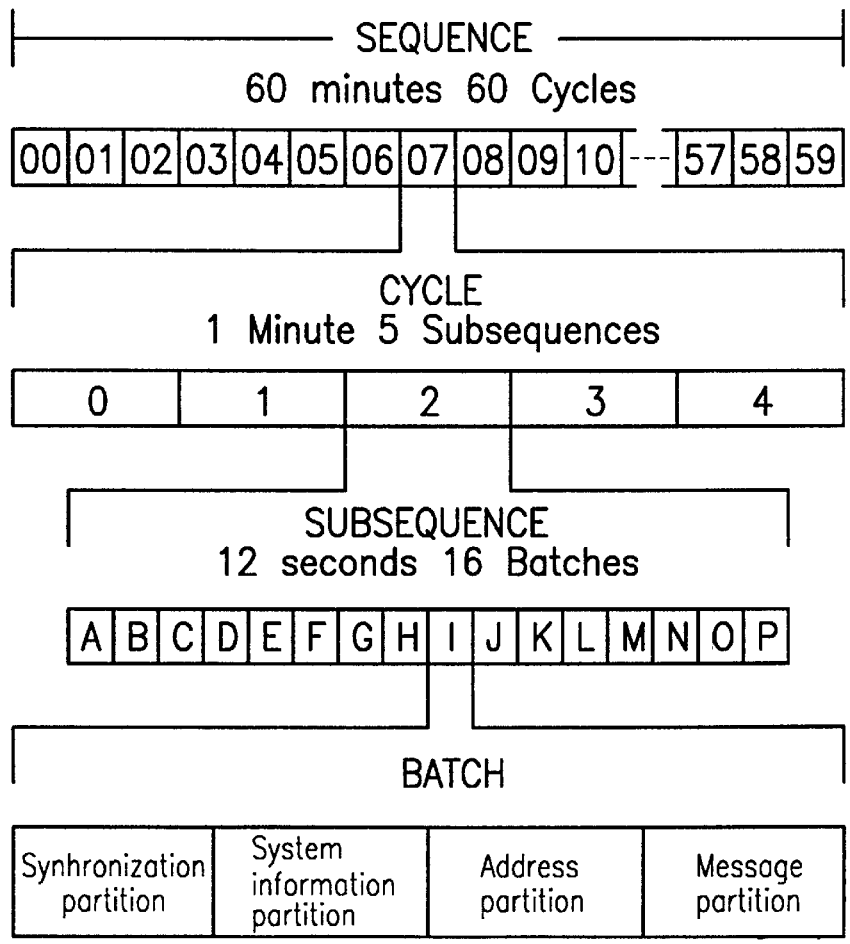
FIG. 2 shows the data structures in the ERMES protocol.

The protocol-processing device is used to generate the format of data structures as shown in FIG. 2. First, one day is divided into 24 sequences, so the time interval of a sequence is 1 hour. Next, a sequence is divided into 60 cycles, so the time interval of a cycle is 1 minute. Each cycle includes 5 subsequences, so the time interval of a subsequence is 12 seconds. Each subsequence further is divided into 16 batches. Each of the first to fifteen batches (A~O) has 154 codewords, and the sixteenth batch has 190 codewords. Every codeword consists of 30 bits.

Each batch includes four data parts:

(1) The synchronization partition includes a synchronization codeword for establishing synchronization link, and a preamble codeword.

(2) The system information partition includes three system codewords SI1, SI2, and SSI. SI1 and SI2 further include the messages: country code (7 bits), operator code (3 bits), paging area code (PA code, 6 bits), external traffic indicator (ETI, 1 bit), frequency subset indicator (FSI, 5 bits), cycle number (6 bits), subsequence number (SSN, 3 bits), and batch number (4 bits).

(3) The address partition includes the initial address (IA) of the pager.

(4) The message partition includes the messages to transmit to the pager.

When the pager is turned on, after activating starting signal ON (ON=1), the protocol processing device starts to count based on the system clock signal (soclk), and transforms the digital data received from phase-lock loop into the data of codewords, batches, subsequences, cycles, sequences, such that the RF signal controller (rfcontrol) can generate accurate RF controlling signals according to the received data.

II. RF signal controller

Figure 3A:
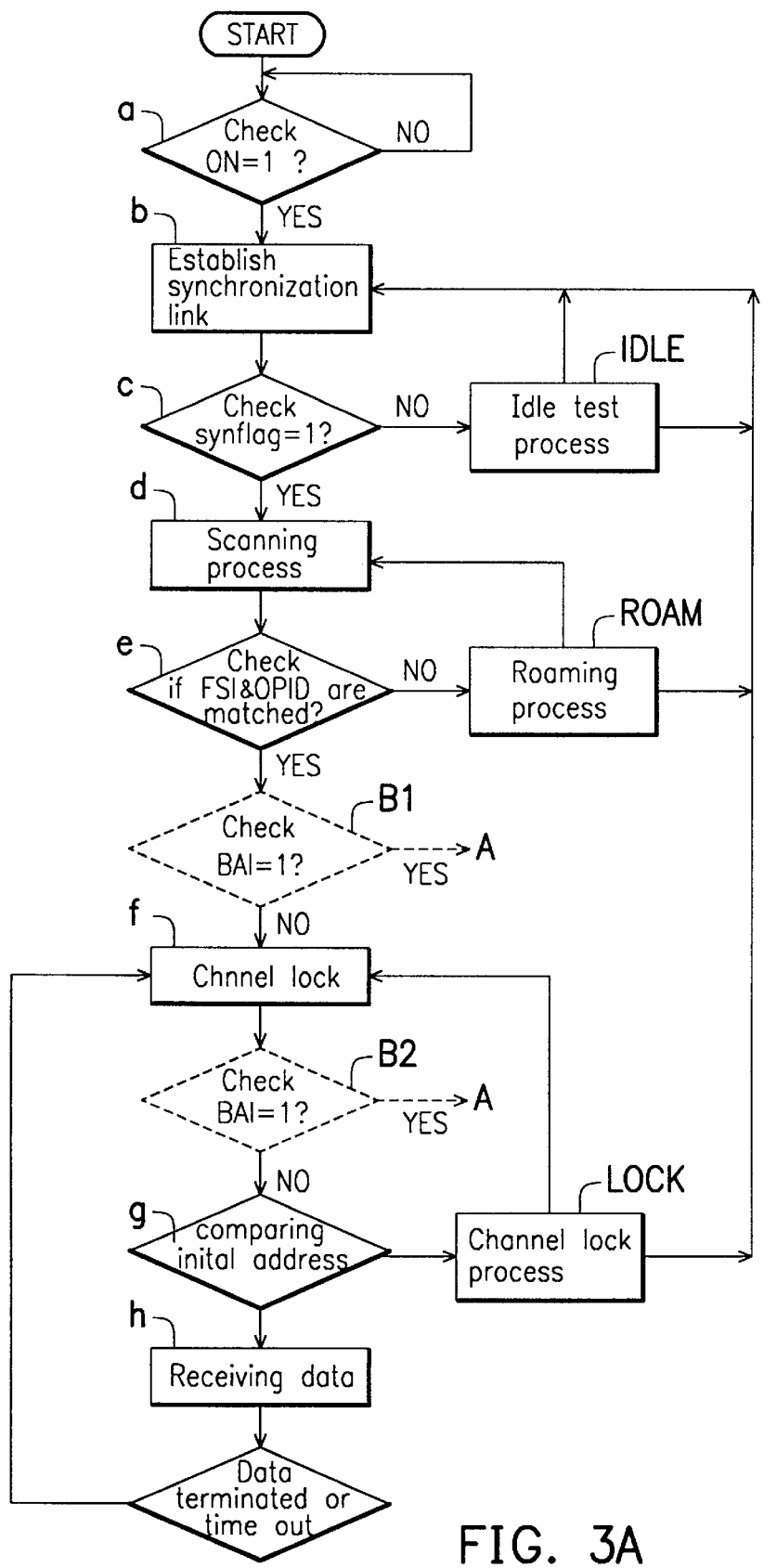
FIG. 3A shows the main flow chart of the controlling method according to the present invention.

FIG. 3A~3D illustrate the flow chart of the method for controlling the RF signal controller (rfcontrol) in the pager. FIG. 3A shows the main flow chart of the controlling method according to the present invention, the steps are described as follows.

Step a:

The pager (or rfcontrol) keeps checking the state of the starting signal ON, and if ON equals 1 then the next step is carried out.

Step b:

On the starting channel, two time intervals of the batches serve as a time unit, and the RF circuit is turned on for two thirds of every time unit such that whenever the RF controller is turned on, the synchronization partition can be included and read during the time unit. Therefore, the pager can try to establish synchronization link with a base station as rapidly as possible.

Step c:

Next, the pager checks a flag synflag, and if synflag equals 1, it means that the synchronization link has been established, otherwise the synchronization link has failed and a idle test process (IDLE) is carried out.

Step d:

After synchronization, the pager carries out a channel scanning process to find the home channel, because the starting channel is not necessarily the home channel.

Step e:

The pager compares the frequency subset number (FSN) and operator identity ($OPID_P$) established in the pager with the frequency subset indicator (FSI) and operator identity (OPID) packaged in the system information partition, wherein if it is matched, the next step is carried out.

If the comparing result is not matched, the pager could be in a roaming state, and therefore it can not receive a corresponding indicator. Consequently, a roaming process (ROAM) must be carried out to ensure if the pager is in a roaming state.

Figure 4:
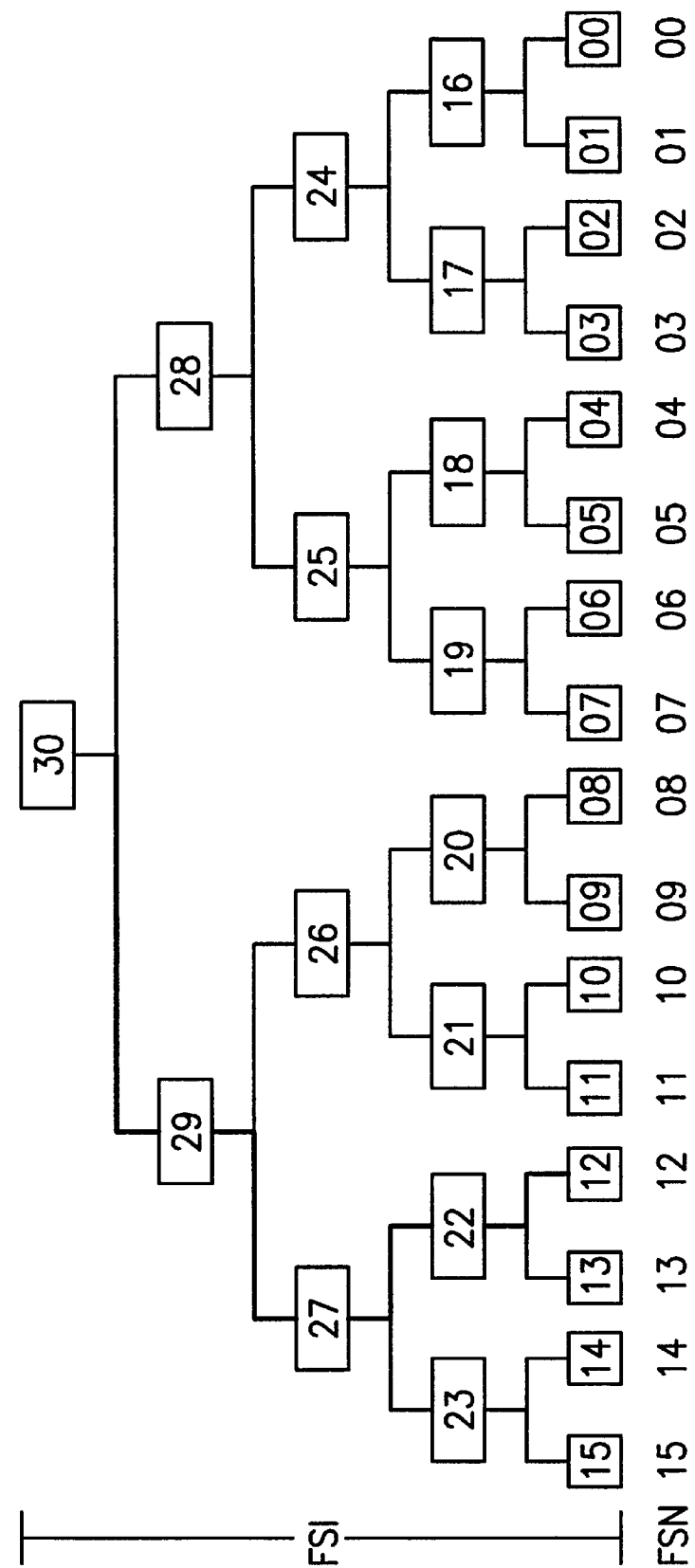
FIG. 4 shows the relationship between FSN and FSI.

The relationship between FSN and FSI are depicted in FIG. 4. The possible values of FSN are 00, 01, 02, . . . , 15, and the possible values of FSI are 00, 01, 02, . . . , 30 arranged in the form of a tree. Referring to FIG. 4, the FSN preset in the pager is 12, for example, and when the FSI received by the pager is any one of 12, 22, 27, 29, or 30, it means that the pager has found the home channel.

Step f:

The pager carries out the channel locking process trying to lock on the home channel to receive a message.

Step g:

The pager compares its own initial address (IA) with the data packaged in the address partition, wherein if there is an address in the address partition corresponding to the initial address of the pager, then the pager locks on the channel to advance to the next step, or if not, the channel locking process (LOCK) is carried out.

Step h:

After locking the correct channel, the pager receives the data in the message partition iteratively, and when the pager finishes receiving data in this message partition or when the predetermined receiving time interval has passed (time out), then the step (f) is carried out again.

The idle test process (IDLE), roaming process (ROAM), and channel lock process (LOCK) mentioned above will be described hereinafter respectively.

Figure 3B:
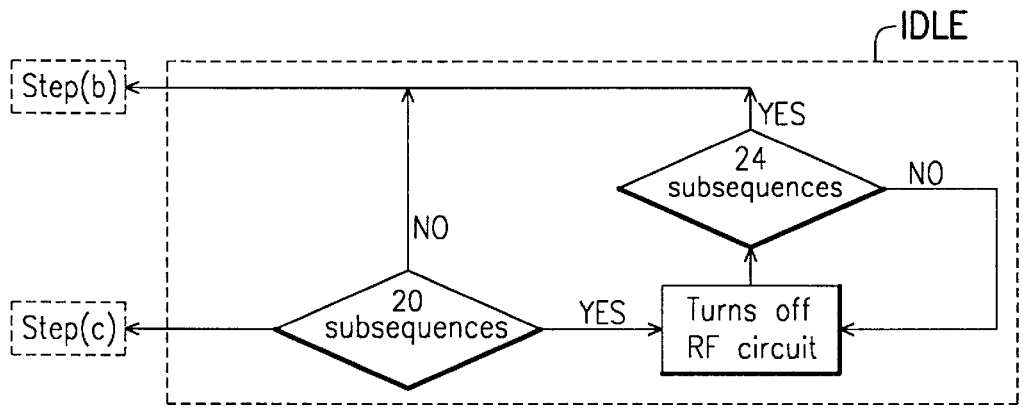
FIG. 3B shows the flow chart of the idle process of the controlling method according to the present invention.

Idle Test Process (IDLE):

Referring to FIG. 3B, the idle test process (IDLE) mentioned in step (c) and FIG. 3A comprises the following steps.

(c1) In the case of failing to establish synchronization, if the time has passed a first specific time interval, for example 20 time intervals of the subsequence (240 seconds) after starting said idle process, then the following step is carried out. Otherwise, the step (b) in FIG. 3A is carried out again.

(c2) The RF circuit in the pager is turned off for a second specific time interval, for example 24 time intervals of the subsequence (288 seconds), and then step (b) in FIG. 3A is carried out again.

Figure 3C:
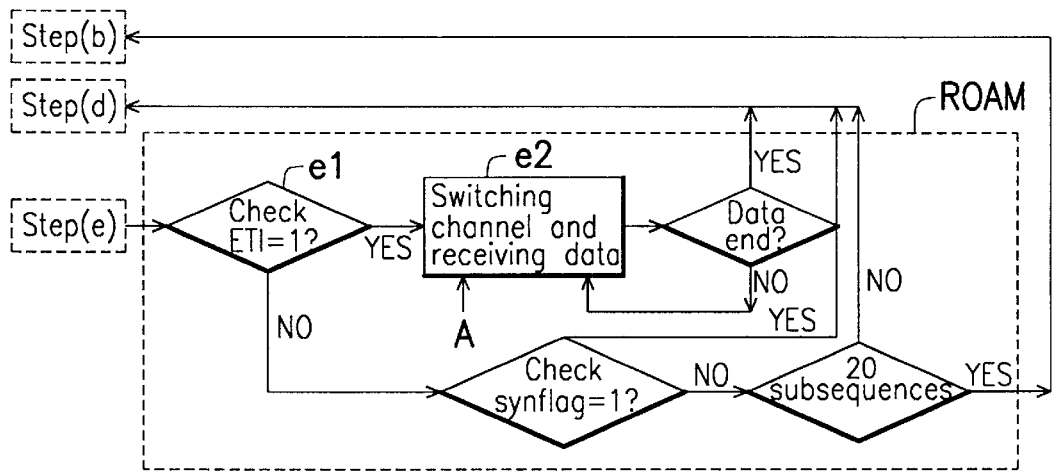
FIG. 3C shows the flow chart of the roaming process of the controlling method according to the present invention.

Roaming Process (ROAM):

Referring to FIG. 3C, the roaming process (ROAM) mentioned in step (e) and FIG. 3A comprises the following steps:

(e1) Checks if there is an external traffic indicator (if ETI=1?) in the system information partition. If ETI equals 1, it means the pager is on roaming state and the following step is carried.

Otherwise, the synchronization Link between the pager and the base station is checked. If the link is established then step (d) is carried out again, otherwise if the link can be established during a third specific time interval, for example 10 time intervals of the subsequence (120 seconds), then step (d) is carried out again, otherwise step (b) is carried out again.

(e2) In the case of ETI=1 (in roaming state), the data will not transmit on a fixed channel. The data is distributed in every channel, and therefore the pager receives data in the mode of channel switching until the data is terminated, and the step (d) is carried out again.

Figure 5:
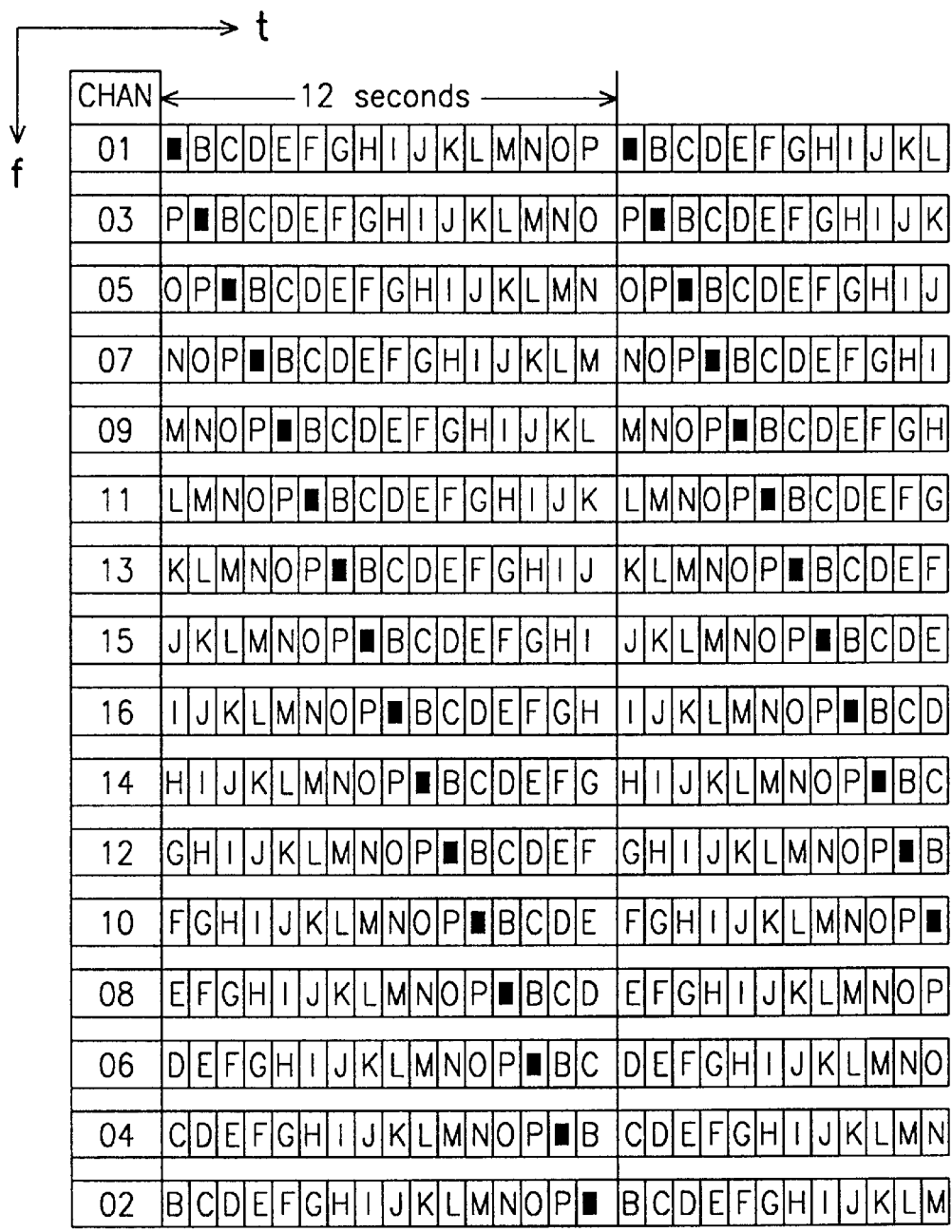
FIG. 5 shows the cross-reference chart between channel switching and time.

Receiving data via the mode of channel switching is described with reference to FIG. 5. FIG. 5 shows the cross-reference chart between channel switching and time. In FIG. 5, the transverse coordinates means time scale, and the longitudinal coordinates means frequency scale. The data of batches A~P are transmitted respectively in channels 01~16, but the batches transmitted in the channels 01~16 are different at the same time, as shown in FIG. 5. Since the data is transmitted in different channels while in the roaming state, the pager tries to directly receive the home batch with the initial address (IA) in order to improve the efficiency of data reception. In this embodiment, provided that the home batch is A (a black block), and the channels are switched in the order as 01-03-05 . . . 15-16-14 . . . 04-02-01- . . . , as shown in FIG. 5. Consequently, it is very clear that the pager can continue to obtain the home batch A during channel switching, as time passes along the time coordinates in FIG. 5, and the efficiency is improved.

Figure 3D:
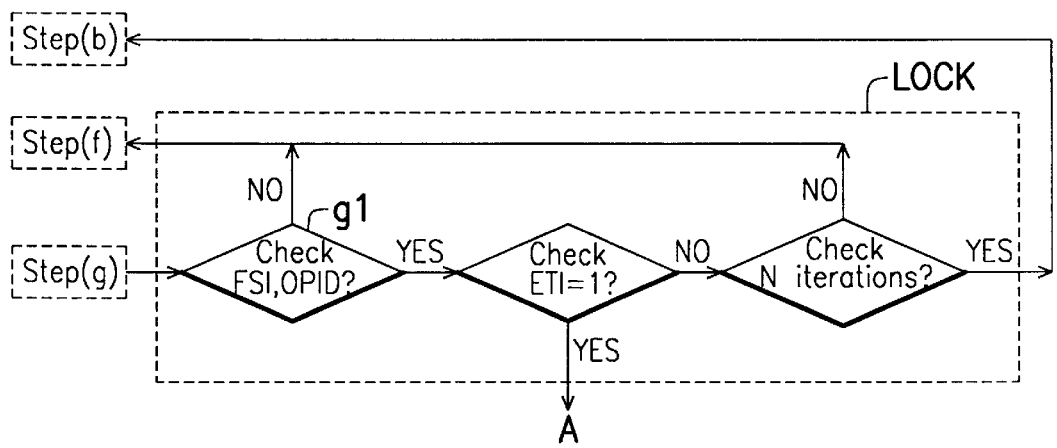
FIG. 3D shows the flow chart of the channel locking process of the controlling method according to the present invention.

Channel lock process (LOCK):

Referring to FIG. 3D, the roaming process (ROAM) mentioned in step (g) and FIG. 3A comprises the following steps:

(g1) Checks the frequency subset indicator (FSI) and operator identity (OPID) in the received system information partition, wherein if they are not lost, it means the previous home channel locking is wrong, and the step (f) must be carried out again to lock on the home channel.

Otherwise, if FSI and OPID are lost, the pager could be in the roaming state. Further if there is external traffic indicator in the received system information partition (that is ETI=1), the following step (g2) is carried out. Otherwise if a counter value exceeds a specific value N, then the step (b) is carried out again, or else the step (f) is carried out again.

(g2) In the case of ETI=1, the pager receives data in the mode of channel switching as described above until the data is terminated, and the step (d) is carried out again. This step is the same as the step (e2), and thus step (e2) can be carried out instead of step (g2).

III. Channel scanning device

The function of the channel scanning device in the pager is to control the channels switching in some specific order, such that the pager can keep tracking and receiving the data of the home batches during the channel switching, as shown in FIG. 5, to improve the efficiency.

On the other hand, when the user moves from one region to another, the base stations in these two regions could be different, and therefore the reception of the pager will be influenced or interrupted due to differences in channel frequency. Furthermore, when the user is in the marginal area between two base stations, the pager can not lock on one single frequency channel, and thus the performance of the pager is degraded.

To overcome these problems, the controlling method can further comprise two detecting process (B1) and (B2), as the dashed blocks shown in FIG. 3A. The functions of steps B1 and B2 are the same. When a border area indicator (BAI) in the system information partition is detected to be equal to 1, the pager carries out the step (e2) in FIG. 3C to receive data in the mode of channel switching. After the data transmission is terminated, the step (d) is carried out again.

The border area checking step (B1) is carried out before carrying out the channel locking step (f). Since if the pager is in the border area or moves around before channel locking, then it is not necessary to carry out the channel locking step to improve the efficiency.

The border area checking step (B2) is carried out after carrying out the channel locking step (f). Since, even though the channel is locked, the user may move from the region of original base station to another region with a base station or a different frequency, and the step (B2) is carried out to optimize pager's performance during channel frequency changing.

In view of the above descriptions, the method for controlling the signals of an ERMES pager according to the present invention allow pagers including the protocol process device, channel scanning device, and RF signal controller, to establish a synchronization link with the base stations during the shortest time interval by using the method disclosed above, and lock on the home channel rapidly to receive messages by channel scanning. Furthermore, under the control of the method the pagers can finish receiving messages in the mode of channel switching, even while in roaming states or in marginal areas with weak signals.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for controlling the signals of an ERMES pager comprising the steps of:
   (a) repeating testing until a starting signal is detected;
   (b) receiving batch data from any base station, wherein said batch data include a synchronization partition, system information partition, address partition, and message partition, whereby said pager is synchronized with said base station by using the data packaged in said synchronization partition;
   (c) checking if synchronization link is established, and if it is established then the following step is carried out;
   (d) carrying out channel scanning;
   (e) comparing the frequency subset number and operator identity established in said pager with the frequency subset indicator and operator identity packaged in said system information partition, wherein if the comparing result is not matched, a roaming process is carried out, and if it is matched, the following step is carried out;
   (f) carrying out channel locking;
   (g) comparing the initial address of said pager with the data packaged in said address partition, wherein if there is an address in said address partition corresponding to said initial address, said pager locks on the channel to advance to the following step, and if not, the channel locking process is carried out again; and
   (h) receiving the data in said message partition in iteration, such that when said pager finishes receiving said data in said message partition or the predetermined receiving time interval has passed, the step (f) is carried out again.

2. The method as claimed in claim 1, wherein if the synchronization link is not established in step (c), a idle process is carried out, and said idle process comprises the following steps:
   (c1) checking if the time has passed a first specific time interval after starting said idle process, wherein if it is true, the following step is carried out, otherwise the step (b) is carried out again; and
   (c2) turning off the RF circuit in said pager for a second specific time interval, and then carrying out step (b) again.

3. The method as claimed in claim 1, wherein said roaming process comprises the following steps:
   (e1) checking if there is an external traffic indicator in said system information partition, wherein if it is true the following step is carried, otherwise the synchronization link between said pager and said base station is checked, wherein if the link is established then step (d) is carried out again, otherwise if the link can be established during a third specific time interval then step (d) is carried out again, otherwise step (b) is carried out again; and
   (e2) receiving data in the mode of channel switching until the data is terminated, and the step (d) is carried out again.

4. The method as claimed in claim 1, wherein said channel locking process comprises the following steps:
   (g1) checking the frequency subset indicator and operator identity in the received system information partition, wherein if they are not lost, the step (f) is carried out again, or if there is an external traffic indicator in the received system information partition, the following step is carried out, otherwise if a counter value exceeds a specific value, the step (b) is carried out again, and if not, the step (f) is carried out again; and
   (g2) receiving data in the mode of channel switching until the data is terminated, and the step (d) is carried out again.

5. The method as claimed in claim 1, wherein sixteen batches constitute data of a subsequence, five said subsequences constitute data of a cycle, and sixty said cycles constitute data of a sequence, and the time interval occupied by said sequence is 1 hour, and the time interval occupied by said subsequence is 12 seconds.

6. The method as claimed in claim 2, wherein said first specific time interval is 240 seconds and said second specific time interval is 288 seconds.

7. The method as claimed in claim 3, wherein said third specific time interval is 120 seconds.

8. The method as claimed in claim 1, wherein a border area checking step is carried out to check if there is a border area indicator, if it is true, said pager receives data in the mode of channel switching until the data is terminated, and then the step (d) is carried out again.

9. The method as claimed in claim 8, wherein said border area checking step is carried out, after carrying out the step (e), and if there is no border area indicator is detected, then the step (f) is carried out.

10. The method as claimed in claim 8, wherein said border area checking step is carried out, after carrying out the step (f), and if no border area indicator is detected, then the step (g) is carried out.

11. The method as claimed in claim 8, wherein said border area checking step is carried out, after carrying out the step (e), and if no border area indicator is detected, then the step (f) is carried out; in the meantime, said border area checking step is also carried out, after carrying out the step (f), and if no border area indicator being detected, then the step (g) is carried out.

12. A method for controlling the signals of an ERMES pager comprising the steps of:

(a) repeating testing until a starting signal is detected;

(b) receiving batch data from any base station, wherein said batch data include a synchronization partition, system information partition, address partition, and message partition, whereby said pager is synchronized with said base station by using the data packaged in said synchronization partition;

(c) checking if synchronization link is established, and if it is established then the following step is carried out, otherwise an idle process is carried out, wherein said idle process comprises the following steps:

(c1) checking if the time has passed a first specific time interval after starting said idle process, wherein if it is true, the following step is carried out, otherwise the step (b) is carried out again; and (c2) turning off the RF circuit in said pager for a second specific time interval, and then carrying out step (b) again;

(d) carrying out channel scanning;

(e) comparing the frequency subset number and operator identity established in said pager with the frequency subset indicator and operator identity packaged in said system information partition, wherein if the comparing result is not matched, a roaming process is carried out, and if it is matched, the following step is carried out;

(f) carrying out channel locking;

(g) comparing the initial address of said pager with the data packaged in said address partition, wherein if there is an address in said address partition corresponding to said initial address, said pager locks the channel to advance to the following step, and if not, the channel locking process is carried out again; and (h) receiving the data in said message partition in iteration, when said pager finishes receiving said data in said message partition or the predetermined receiving time interval has passed, the step (f) is carried out again.

13. The method as claimed in claim 12, wherein said roaming process comprises the following steps:

(e1) checking if there is an external traffic indicator in said system information partition, wherein if it is true the following step is carried, otherwise the synchronization link between said pager and said base station is checked, wherein if the link is established then step (d) is carried out again, otherwise, if the link can be established during a third specific time interval then step (d) is carried out again, otherwise step (b) is carried out again; and (e2) receiving data in the mode of channel switching until the data is terminated, and the step (d) is carried out again.

14. The method as claimed in claim 12, wherein said channel locking process comprises the following steps:

(g1) checking the frequency subset indicator and operator identity in the received system information partition, wherein if they are not lost, the step (f) is carried out again, or if there is external traffic indicator in the received system information partition, the following step is carried out, otherwise, if a counter value exceeds a specific value, the step (b) is carried out again, and if not, the step (f) is carried out again; and (g2) receiving data in the mode of channel switching until the data is terminated, and the step (d) is carried out again.

15. The method as claimed in claim 12, wherein sixteen batches constitute data of a subsequence, five said subsequences constitute data of a cycle, and sixty said cycles constitute data of a sequence, and the time interval occupied by said sequence is 1 hour, and the time interval occupied by said subsequence is 12 seconds.

16. The method as claimed in claim 15, wherein said first specific time interval is 240 seconds and said second specific time interval is 288 seconds.

17. The method as claimed in claim 13, wherein said third specific time interval is 120 seconds.

18. The method as claimed in claim 12, wherein a border area checking step is carried out to check if there is a border area indicator, if it is true, said pager receives data in the mode of channel switching until the data is terminated, and then the step (d) is carried out again.

19. The method as claimed in claim 18, wherein said border area checking step is carried out, after carrying out the step (e), and if no border area indicator is detected, then the step (f) is carried out.

20. The method as claimed in claim 18, wherein said border area checking step is carried out, after carrying out the step (e), and if no border area indicator is detected, then the step (f) is carried out; in the meantime, said border area checking step is also carried out, after carrying out the step (f), and if no border area indicator is detected, then the step (g) is carried out.

* * * * *